United States Patent
Wu et al.

(10) Patent No.: US 7,792,527 B2
(45) Date of Patent: Sep. 7, 2010

(54) WIRELESS NETWORK HANDOFF KEY

(75) Inventors: Gang Wu, Cupertino, CA (US); Fujio Watanabe, San Jose, CA (US); Alexander Hagen, Montara, CA (US)

(73) Assignee: NTT Docomo, Inc., Tokyo (JP)

( * ) Notice: Subject to any disclaimer, the term of this patent is extended or adjusted under 35 U.S.C. 154(b) by 1529 days.

(21) Appl. No.: 10/290,650

(22) Filed: Nov. 8, 2002

(65) Prior Publication Data
US 2004/0203783 A1 Oct. 14, 2004

(51) Int. Cl.
*H04W 4/00* (2009.01)
*H04M 11/00* (2006.01)
*H04J 3/16* (2006.01)

(52) U.S. Cl. .................... 455/435.1; 455/403; 370/466

(58) Field of Classification Search .................. 455/436, 455/410, 435.1, 423, 452.1, 411, 456.1, 403, 455/41.1; 709/227; 705/40; 370/428, 328, 370/466; 713/168; 380/277, 270, 272, 248, 380/247; 379/230; 340/5.54, 7.21
See application file for complete search history.

(56) References Cited

U.S. PATENT DOCUMENTS

| | | | | |
|---|---|---|---|---|
| 6,167,248 | A * | 12/2000 | Hamalainen et al. | 455/403 |
| 6,360,264 | B1 * | 3/2002 | Rom | 709/227 |
| 6,370,380 | B1 * | 4/2002 | Norefors et al. | 455/436 |
| 6,408,063 | B1 * | 6/2002 | Slotte et al. | 379/230 |
| 6,522,880 | B1 * | 2/2003 | Verma et al. | 455/436 |
| 6,587,680 | B1 * | 7/2003 | Ala-Laurila et al. | 455/411 |
| 6,725,050 | B1 * | 4/2004 | Cook | 455/456.1 |
| 6,842,462 | B1 * | 1/2005 | Ramjee et al. | 370/466 |
| 2001/0006552 | A1 * | 7/2001 | Salokannel | 380/272 |
| 2002/0001290 | A1 * | 1/2002 | Bender et al. | 370/328 |
| 2002/0041689 | A1 * | 4/2002 | Morimoto | 380/270 |
| 2002/0065772 | A1 * | 5/2002 | Saliba et al. | 705/40 |

(Continued)

OTHER PUBLICATIONS

Nokia "Nokia Operator Wireless LAN, The Nokia vision of global roaming with high speed laptop connectivity," *White Paper*, 2000.
Juha Ala-Laurila, Jouni Mikkonen and Jyri Rinnemaa, "Wireless LAN Access Network Architecture for Mobile Operators," *IEEE Communications Magazine*, Nov. 2001.
Tomas Boström, Tomas Goldbeck-Löwe and Ralf Keller, "Ericsson Mobile Operator WLAN Solution, WLAN as a complement to GPRS and UMTS," *Ericsson Review* No. 1, 2002.

*Primary Examiner*—Charles N Appiah
*Assistant Examiner*—Kiet Doan
(74) *Attorney, Agent, or Firm*—Haynes and Boone, LLP; Edward C. Kwok

(57) ABSTRACT

A handoff key is provided for facilitating a hand off of a wireless terminal from a first access point to a second access point. The handoff key may be generated by a server and communicated to the first and second access points. Alternatively, the handoff key may be generated one of the access points and transmitted to the other access point. The first access point may transmit the handoff key to the wireless terminal before the handoff. Shortly after the handoff, the wireless terminal and the second access point may communicate data encrypted with the handoff key. Later, an authentication server may authenticate the wireless terminal, causing the second access point to provide the wireless terminal with a session key. Thereafter, the wireless terminal and the second access point may communicate data encrypted with the session key.

21 Claims, 6 Drawing Sheets

U.S. PATENT DOCUMENTS

| | | | |
|---|---|---|---|
| 2002/0072358 A1* | 6/2002 | Schneider et al. | 455/423 |
| 2002/0076054 A1* | 6/2002 | Fukutomi et al. | 380/277 |
| 2002/0082018 A1* | 6/2002 | Coskun et al. | 455/439 |
| 2002/0085719 A1* | 7/2002 | Crosbie | 380/248 |
| 2002/0174335 A1* | 11/2002 | Zhang et al. | 713/168 |
| 2002/0191627 A1* | 12/2002 | Subbiah et al. | 370/428 |
| 2002/0197979 A1* | 12/2002 | Vanderveen | 455/410 |
| 2003/0092444 A1* | 5/2003 | Sengodan et al. | 455/436 |

* cited by examiner

WIRELESS NETWORK HANDOFF KEY

FIELD OF THE INVENTION

The present invention relates generally to a wireless network environment, and more particularly to a method and system for providing a handoff key for a wireless network environment.

BACKGROUND OF THE INVENTION

One common distributed computing environment is a local area network (LAN). A LAN is a peer-to-peer communication network that enables terminals or stations to communicate directly on a point-to-point or point-to-multipoint basis. A LAN is optimized for a moderate-sized geographic area, such as a single office building, a warehouse, or a campus. In most LANs, communications are transmitted via wires.

Recently, wireless LAN (WLAN) technology has become popular. A WLAN operates in much the same manner as a wired LAN, except the transmission medium is radio waves rather than wires. In a typical WLAN topography, terminals communicate with a larger network, such as a wired LAN or wide area network (WAN), through access points. An access point is a terminal that acts as a gateway between the WLAN and the larger network.

In wired LANs, physical security can be used to prevent unauthorized access. However, physical security may be impractical in WLANs, so an authentication process for network access and an encryption/decryption mechanism may be required for security. Access points of a WLAN may illustratively be located in meeting rooms, restaurants, hallways, corridors, lobbies, and the like. A terminal accessing the WLAN may move out of range of a first access point and into range of a second access point. When this occurs, a handover (handoff) from the first access point to the second access point may be required.

Generally, the terminal must communicate terminal authentication packets with an authentication server, which may be a home registration server, before it may access the WLAN through the second access point. This authentication process could be time consuming, interrupting communications between the terminal and another terminal. This interruption could be problematic, especially for real-time applications, such as streaming applications and voice over IP (VoIP) applications, which require uninterrupted communications for smooth operation and quality of service (QoS) guarantees. It would be desirable to provide method and system for quickly authenticating a terminal during a handoff.

SUMMARY OF THE INVENTION

A method for handover in a wireless communication network is provided. A handoff WEP key may be provided to a first and a second access point. The first access point may transmit the handoff WEP key to a wireless terminal associated therewith. The second access point may authenticate the wireless terminal, and communicate data packets encrypted with the handoff WEP with the wireless terminal.

The first access point may only transmit the handoff WEP key to the wireless terminal if the wireless terminal is actively communicating via the first access point. The first access point may encrypt the handoff WEP key with a session WEP before transmitting it to the wireless terminal. The second access point may authenticate the wireless terminal with an authentication server. Authenticating the wireless terminal may include communicating authentication packets via the second access point between the wireless terminal and the authentication server. Authenticating the wireless terminal may also include transmitting terminal authorization packets from the authentication server to the second access point.

The terminal authentication packets may be transmitted from the wireless terminal to the second access point encrypted by the handoff WEP key. Alternatively, the terminal authentication packets may be transmitted from the wireless terminal to the second access point unencrypted. After the wireless terminal is authenticated by the authentication server, the second access point may transmit a session WEP key to the wireless terminal after.

A server may generate the handoff WEP key, and transmit it from the server to the first and second access points. The second access point may authenticate the wireless terminal by sending a challenge message encrypted with the handoff WEP key to the wireless terminal, receiving the decrypted challenge message from the wireless terminal, and determining if the wireless terminal correctly decrypts the challenge message.

Additionally, a wireless network is provided. The wireless network may include a wireless terminal that may receive and encrypt data with a handoff WEP key. The wireless terminal may transmit the encrypted data. The wireless network may also include a first access point that may transmit the handoff WEP key to the wireless terminal, and a second access point that may receive encrypted data from the wireless terminal and decrypt it with the handoff WEP key.

The wireless network may further include a server coupled to the first and second access points that generates the handoff WEP key and transmits it to the first and second access points. The wireless network may also include a server coupled to the first and second access points that authenticates the wireless terminal.

Additionally, a wireless access point having a memory is provided. The memory may include instructions to receive a packet and delete the packet if the packet is a data packet that is not encrypted with a handoff WEP key. The memory may include instructions to decrypt and transmit the packet if the packet is a data packet that is encrypted with a handoff WEP key. The memory may also include instructions to transmit the packet if the packet is a terminal authentication packet.

Further, the memory may include instructions to read the media access control address for a terminal that sent the packet and determine whether the memory includes a session WEP key for the terminal. If so, the memory may include instructions to decrypt and transmit the packet.

Additionally, a wireless terminal having a memory is provided. The memory may include a code segment that receives and decrypts a handoff WEP key that has been encrypted with a first session WEP key. The memory may also include a code segment that encrypts data with the handoff WEP key and a code segment that transmits the encrypted data. Furthermore, the memory may include a code segment that receives and decrypts a second session WEP key that is encrypted with the handoff WEP key.

The memory may also include a code segment that encrypts and decrypts data with the first session WEP key until the handoff WEP key is received, a code segment that encrypts and decrypts data with the handoff WEP key until the second session WEP key is received, and a code segment that encrypts and decrypts data with the second session WEP key after the second session WEP is received.

Additionally, a wireless network is provided. The wireless network may include a means for providing a handoff WEP key to first and second access points. The wireless network may also include means for transmitting the handoff WEP key from the first access point to a wireless terminal. Also, the wireless network may include means for authenticating the wireless terminal with the second access point, and means for communicating data packets encrypted with the handoff WEP key between the second access point and the wireless terminal. Furthermore, wireless network may include means for encrypting the handoff WEP key with a session WEP key before transmitting it to the wireless terminal.

DETAILED DESCRIPTION OF THE PRESENTLY PREFERRED EMBODIMENTS

Figure 1:
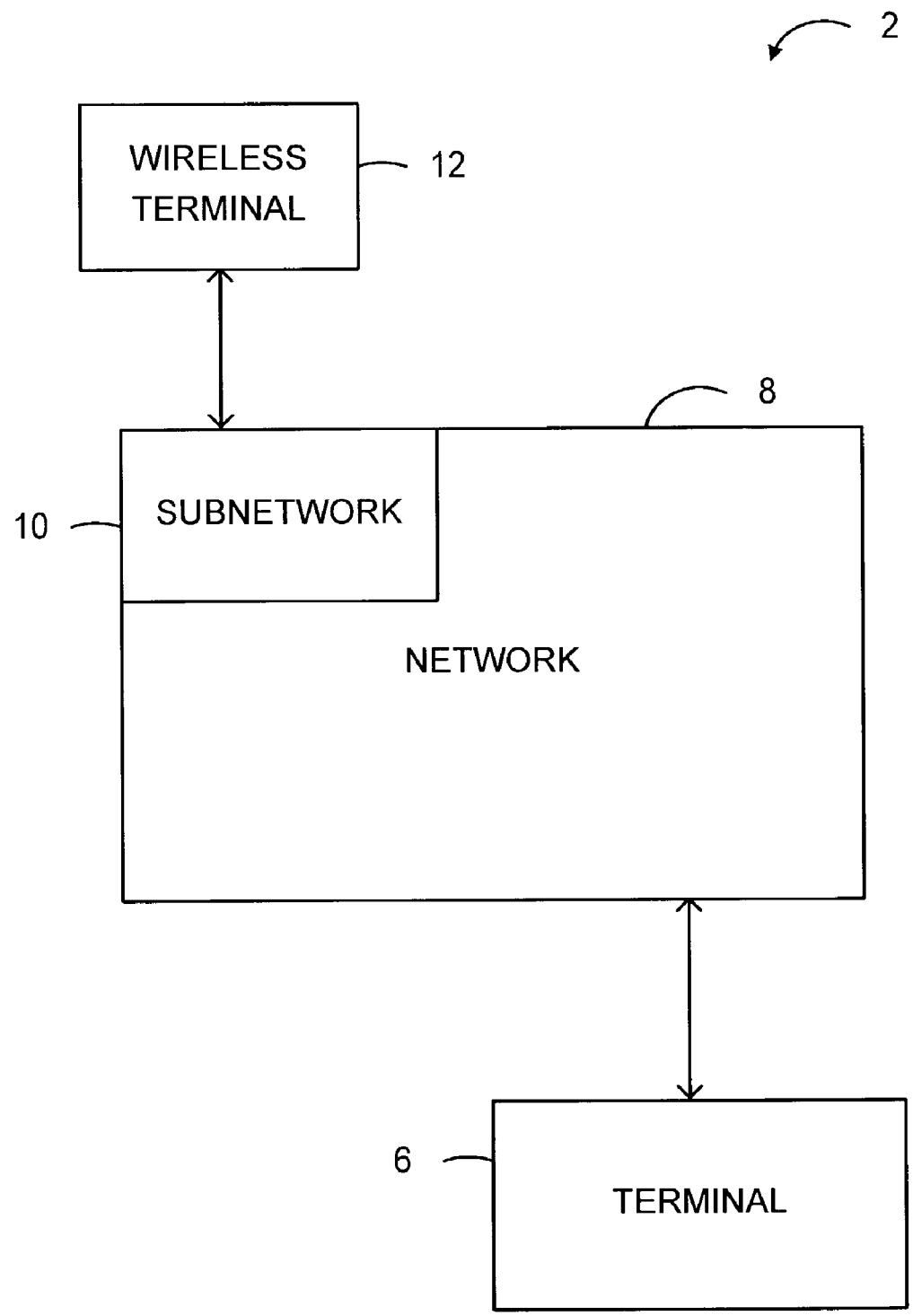
FIG. 1 is a system-level block diagram of a distributed computing system.

FIG. 1 is a system level block diagram of a distributed computing system 2. The distributed computing system 2 may be any computing environment where one or more terminals communicate with one or more other terminals. The configuration of the distributed computing system 2 shown in FIG. 1 is merely illustrative. The distributed computing system 2 includes: a wireless terminal 12, a network 8, and a terminal 6. The wireless terminal 12 may communicate with the terminal 6 via the network 8. The network 8 may be a global network, such as the Internet, a wide area networks (WAN), or a local area network (LAN). The network 8 may include wireless communication networks, local area networks (LAN), wide area networks (WAN), satellite networks, Bluetooth networks, or other types of networks. The network 8 preferentially may include a sub-network 10. An illustrative sub-network 10 is shown in FIG. 2.

The terminal 6 and the wireless terminal 12 may each be a desktop computer, a server, a laptop computer, a personal digital assistant (PDA), a pocket PC, a wireless telephone, or some other communications enabled device. The terminals 6 and 12 may each be configured as a client, as a server, or as a peer for peer-to-peer communications. Peer-to-peer communications may include voice over IP (VoIP), video teleconferencing, text messaging, file sharing, video streaming, audio streaming, or other direct communications. The terminals 6 and 12 may be capable of wireless communications, and may be coupled to the network 8 directly or through an access point. The terminal 6 and the wireless terminal 12 may each have a memory including instructions for operation.

Figure 2:
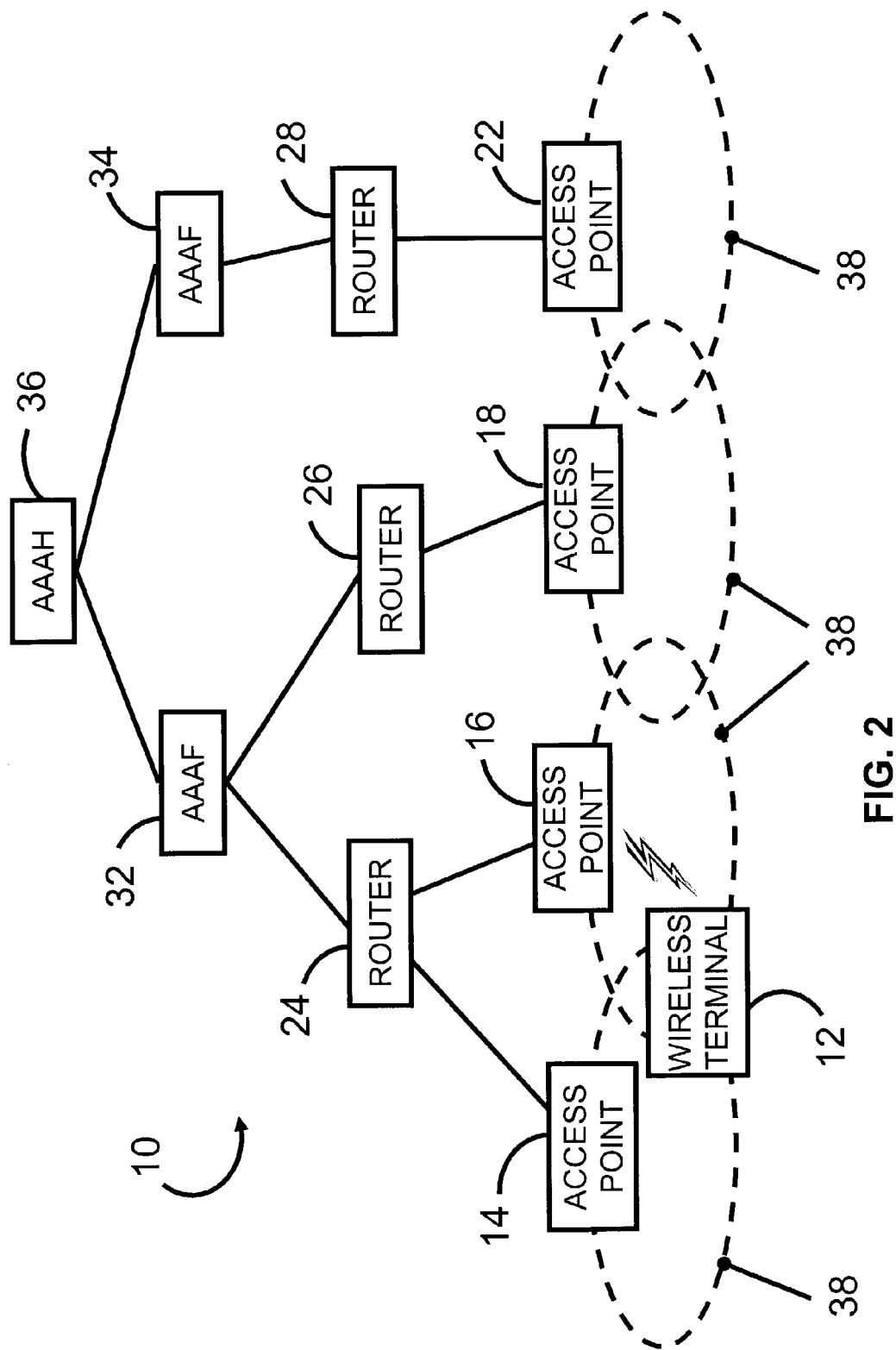
FIG. 2 is a block diagram of a sub-network including a wireless segment.

FIG. 2 is a block diagram of an illustrative sub-network 10 of the network 8. The sub-network 10 may include an authentication, authorization, and accounting home (AAAH) server 36; authentication, authorization, and accounting foreign (AAAF) servers 32 and 34; access routers 24, 26, and 28; and access points 14, 16, 18, and 22. Even though elements of the sub-network 10 are shown as directly coupled in FIG. 2, the elements may be indirectly coupled and separated geographically. The simplified coupling is shown in order to more clearly illustrate communication paths.

The AAAH server 36 may authenticate a set of terminals. This set of terminals may be associated with the AAAH server 36. The AAAH server 36 may have a memory including codes segments and instructions for operation. The AAAH server 36 may include an authentication server that maintains information regarding the identification, authorization, and billing of the associated terminals. The credentials or the identities of the associated terminals may be verified by the AAAH server 36. Also, whether the associated terminals are authorized to access a resource, such as a network, may be determined by the AAAH server 36.

A terminal authentication procedure may be used by the AAAH server 36. The terminal authentication procedure may use digital certificates, username and password pairs, and other challenge and response protocols that facilitate authenticating the associated terminals. As part of the terminal authentication procedure, the AAAH server 36 may communicate terminal authentication packets with the associated terminals and terminal authorization packets with authenticators. The terminal authentication packets may contain digital certificates, keys, usernames, passwords, challenge text, challenge messages, and the like to facilitate verifying the identity or credentials of the terminal. Terminal authorization packets may indicate that an associated terminal is authorized for a level of access to a resource, such as a network. The level of access may indicate full access, no access, or limited access.

The terminal authentication procedure may comply with the Remote Authentication Dial-In User Service (RADIUS) protocol specified in Internet Engineering Task Force (IETF) Request for Comments (RFCs) 2865 and 2866. The terminal authentication procedure also may comply with an authentication process specified in the IEEE 802.1x standard.

After authorizing an associated terminal, the AAAH server 36 may track (account for) resources utilized by the associated terminal. For example, the AAAH server 36 may track metrics regarding access of a network by the associated terminal. Information regarding resource utilization by an associated terminal may be provided to the AAAH server 36.

The AAAH server 36 may generate an encryption key. The encryption key may be a handoff key. The handoff key may be wired equivalent privacy (WEP) key. The term "handoff WEP key" is used herein for an encryption key that may be used simultaneously by more than one access point for encrypted communications with one or more wireless terminals.

The AAAH server 36 may provide handoff WEP keys to access points. During a handoff of a terminal from a first access point to a second access point, communications between the terminal and the second access point may be encrypted by a handoff WEP key. The AAAH server 36 may generate and provide new handoff WEP keys with a frequency adequate for reasonably secure communications.

The AAAF servers 32 and 34 may also authenticate sets of terminals. The AAAF servers 32 and 34, however, may be associated with different sets of terminals than the set associated with the AAAH server 36. For terminals associated with the AAAH server 36, the AAAH server 36 is the "home server", and the AAAF servers 32 and 34 are "foreign servers".

For terminals associated with the AAAF server 32, the AAAF server 32 is the "home server" and the AAAH server 36 is the "foreign server". For clarity, the names of the servers have been chosen according to their relationship with the illustrative wireless terminal 12. Foreign servers are discussed to illustrate the versatility of the present invention, not to limit it.

The AAAF servers 32 and 34 may indirectly authenticate terminals associated with the AAAH server 36. The AAAF servers 32 and 34 may each have a memory including code segments and instructions for operation. The AAAF servers 32 and 34 may have no innate information regarding the identities of terminals associated with the AAAH server 36. Nevertheless, the AAAF servers 32 and 34 may indirectly authenticate and authorize terminals associated with the AAAH server 36 by communicating terminal authentication packets and terminal authorization packets with the AAAH server 36. The AAAF servers 32 and 34 may account for resources utilized by terminals associated with the AAAH server 36, and provide accounting information to the AAAH server 36.

Each AAAF server 32 and 34 may generate handoff WEP keys. Each AAAF server 32 and 34 may generate handoff WEP keys for access points associated therewith. Alternatively, the AAAF server 32 and 34 may receive a common handoff WEP key from the AAAH server 36.

The access routers 24, 26, and 28 may route packets. Each access router 24, 26, and 28 may be capable of determining a next network node to which a received packet should be forwarded. A network node may be a terminal, a gateway, a bridge, or another router. Each access router 24, 26, and 28 may be coupled to other sub-networks (not shown) and provided a route for packets between the sub-network 10 and the other sub-networks.

Each access point 14, 16, 18, and 22 may provide access to a network. A memory including code segments and instructions for operation may be included in each access point 14, 16, 18, and 22. Access points 14, 16, 18, and 22 may be edge points of a network. Each access point 14, 16, 18, and 22 may be an authenticator, and may require a terminal to be authenticated by an authentication server in order for the terminal to access the network. Before a terminal has been authenticated by an authentication server, the access points 14, 16, 18, and 22 may only allow the terminal to communicate terminal authentication packets with an authentication server. After the terminal has been authenticated by an authentication server, the access points 14, 16, 18, and 22 may allow the terminal to communicate data packets via the network.

The access points 14, 16, 18, and 22 may each include a wireless access port having an associated spatial coverage area 38. The coverage area 38 of each access point 14, 16, 18, and 22 may overlap with the coverage area 38 of one or more adjacent access points 14, 16, 18, and 22. Wireless terminals within the coverage area 38 of an access point 14, 16, 18, or 22, may associate with and communicate with the respective access point.

Encryption keys may be provided by access points 14, 16, 18, and 22 to wireless terminals within the coverage area 38 of the respective access point 14, 16, 18, and 22. Each encryption key may be a session key. A session key may be wired equivalent privacy (WEP) key. The term "session WEP key" is used herein for an encryption key that may be used for encrypted communications between an access point and a wireless terminal. Access points 14, 16, 18, and 22 may generate and provide session WEP keys in compliance with the IEEE 802.11 standard. The procedure for generating a handoff WEP key may be the same as that for generating a session WEP key.

Each access point 14, 16, 18, or 22 may be operable to handoff a terminal to another access point 14, 16, 18, or 22 (handoff access point). During a handoff of a wireless terminal, the handing off access point 14, 16, 18 may provide a handoff WEP key to the wireless terminal. For security reasons, the access points 14, 16, 18, and 22 may deliver a handoff WEP key only to wireless terminals that are "actively" communicating at the time of a handoff. Actively communicating may include running a real-time application, such as a streaming video application or a VoIP application, downloading a file, or otherwise sending or receiving packets. If a terminal is merely associated with an access point 14, 16, 18, or 22 at the time of a handoff, then a handoff WEP key may not provide to the terminal.

During a handoff of a terminal to one of the access points 14, 16, 18, or 22, the access point and the terminal may exchange handoff authentication messages. An illustrative handoff authentication message exchange is shown in Table 1.

TABLE 1

| Wireless Terminal | Handoff Access Point |
|---|---|
| Terminal Identity Assertion<br>Auth. Algorithm ID = "handoff WEP"<br>Auth. transaction sequence number = 1<br>Auth. algorithm dependent information = (none) | |
| | Auth. Algorithm ID = "handoff WEP"<br>Auth. transaction sequence number = 2<br>Auth. algorithm dependent information = challenge text.<br>Result of the requested authentication |
| Auth. Algorithm ID = "handoff WEP"<br>Auth. transaction sequence number = 3<br>Auth. algorithm dependent information = challenge text encrypted by handoff WEP key | |
| | Auth. Algorithm ID = "handoff WEP"<br>Auth. transaction sequence number = 4<br>Auth. algorithm dependent information = the authentication result |

Each handoff authentication message may include an authentication algorithm number to indicate an authentication algorithm for processing the message. For example, "2" may indicate a handoff WEP key algorithm, "1" may indicate a shared key (session key) algorithm, and "0" may indicate an open system (null authentication) algorithm. For the handoff WEP key algorithm, a handoff WEP key may be used to encrypt and decrypt challenge text.

Figure 3:
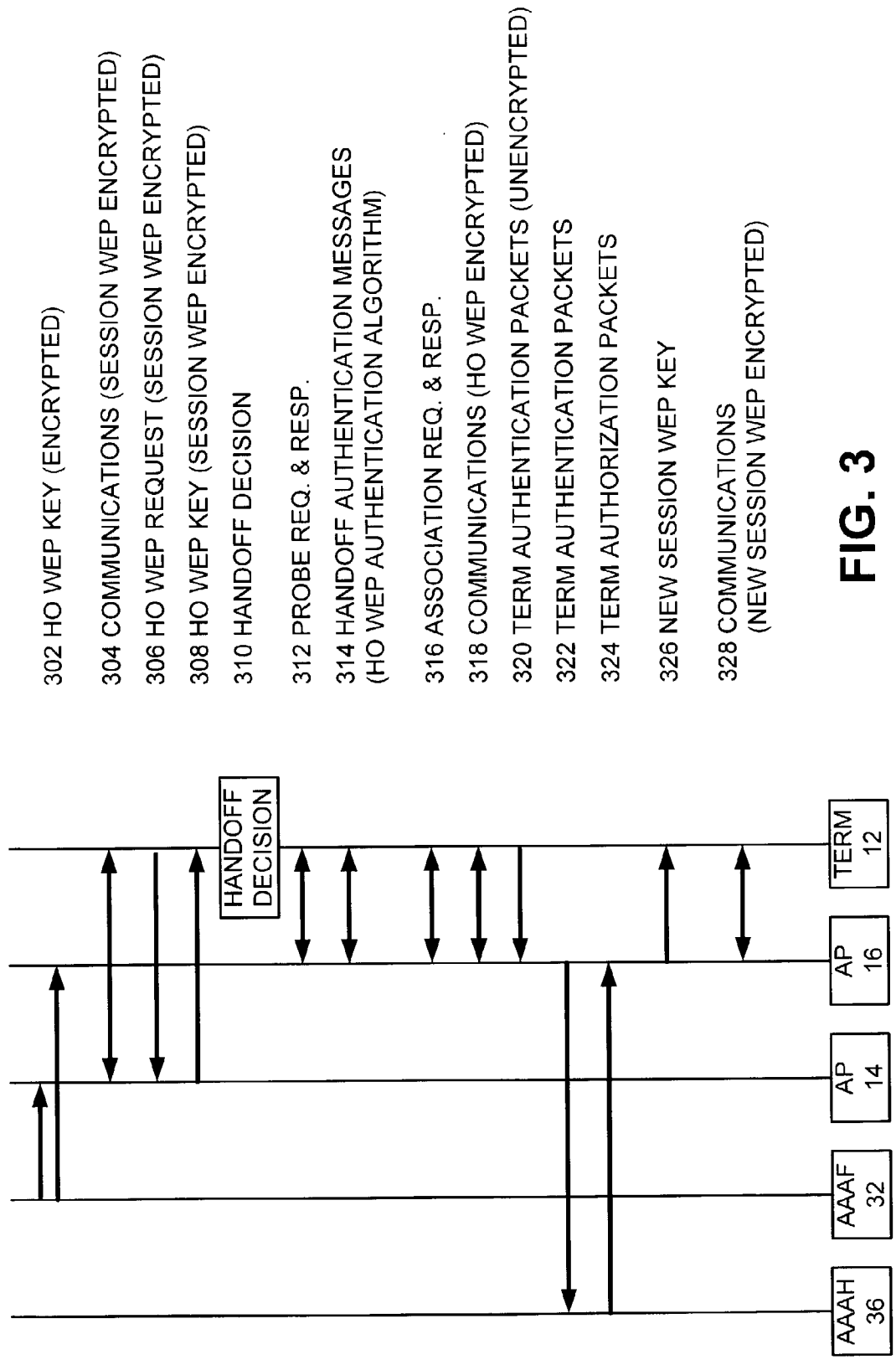
FIG. 3 is a packet communication diagram for a shared key handoff procedure.

FIG. 3 shows a shared key handoff authentication procedure using a handoff WEP key. The access points 14 and 16 are both associated with the AAAF server 32. Therefore, access points 14 and 16 may receive a common handoff WEP key from the AAAF server 32 at 302. The handoff WEP key transmission may be encrypted by an encryption key shared by the AAAF server 32 and the access points 14 and 16. At 304, the wireless terminal 12 is in association with and communicating through the access point 14. Communication between the wireless terminal 12 and the access point 14 may be encrypted by a session WEP key.

To facilitate a quick handoff, the wireless terminal 12 may request a handoff WEP key at 306. The access point 14 may deliver the handoff WEP key to the wireless terminal 12 at 308. The access point 14 may deliver the handoff WEP key securely by encrypting it with the session WEP key. Rather than transmitting the actual handoff WEP key, the access point 14 may deliver a seed to generate the handoff WEP key.

The wireless terminal 12 may decide to handoff from the access point 14 to the access point 16 (handoff access point) at handoff decision 310. To begin the handoff, the wireless terminal 12 may exchange probe request and response packets with the handoff access point 16 at 312. If the probe is successful, then at 314 the wireless terminal 12 may exchange handoff authentication messages with the handoff access point 16. The handoff authentication message exchange at 314 may transpire as described above in Table 1.

If the handoff authentication is successful, then at 316 the wireless terminal 12 may exchange association request and response packets with the handoff access point 16. If successful, then at 316 the wireless terminal 12 may be associated with the handoff access point 16. After the wireless terminal 12 and the handoff access point 16 are associated, data communicated between them at 318 may be encrypted with the handoff WEP. The wireless terminal 12 and the handoff access point 16 may continue to communicate data encrypted by the handoff WEP key until the handoff access point 16 provides a new session WEP key at 326.

For example, the wireless terminal 12 may require a new mobile internet protocol (IP) address in order to communicate via the Internet after association with the handoff access point 16. The handoff WEP key may be used at 318 to encrypt packets relating to mobile IP address acquisition. Illustratively, the wireless terminal 12 may communicate with a dynamic host control protocol (DHCP) server (not shown) at 318 in order to request and receive a new mobile IP address. The wireless terminal 12 may also send a binding update message at 318 that indicates the new mobile IP address. The handoff WEP key may provide sufficient security for packets relating to mobile IP address acquisition.

For a further example, the wireless terminal 12 may be running a real-time application at the time of the handoff. At 318, data packets sent and received by the real-time application may be encrypted by the handoff WEP key for communication via the handoff access point 16. Thus, the real-time application of the wireless terminal 12 may continue communicating with no perceivable interruption during the handoff.

At 320, the wireless terminal 12 may communicate terminal authentication packets to the handoff access point 16. The terminal authentication packets may be encrypted by the handoff WEP key. However, it may not be necessary to encrypt the terminal authentication packets.

At 322, the handoff access point 16 may communicate the terminal authentication packets to the AAAH server 36. After the AAAH server 36 verifies the identity or credentials of the wireless terminal 12, at 324 the AAAH server 36 may communicate terminal authorization packets to the handoff access point 16. The handoff access point 16 may provide a new session WEP key may to the wireless terminal 12 at 326.

At 328, the wireless terminal 12 and the handoff access point 16 may switch from using the handoff WEP key to using the new session WEP key for encryption. The new session WEP key may be used to encrypt communications between the wireless terminal 12 and the handoff access point 16 until another handoff occurs, or communications cease for some other reason.

The shared key handoff authentication procedure described above may also be used for a handoff of the wireless terminal 12 from access point 16 to access point 18. With a one additional action, this procedure may further be used for a handoff of the wireless terminal 12 from access point 18 to access point 22. In this one additional action, the AAAH server 36 may generate and provide the handoff WEP key to the AAAF severs 32 and 34, or directly to the access points 14, 16, 18 and 22. This action provides a common handoff WEP key to access points 18 and 22.

Other methods of generating and communicating a handoff WEP key may be implemented without departing from the scope of the claimed invention. For example, the AAAF sever 32 may generate the handoff WEP key, and communicate it to the AAAH server 36. The AAAH server 36 may then communicate the handoff WEP key to the AAAF sever 34. The methods described herein are merely illustrative.

The shared key handoff authentication procedure shown in FIG. 3 may require a firmware modification for use by some existing equipment. Therefore, an open system handoff authentication procedure is provided in FIG. 4. The open system handoff authentication procedure may comply with the IEEE 802.11 standard, and further with the IEEE 802.1x standard.

Many items of the open system handoff authentication procedure may operate in essentially the same manner as items in the shared key handoff authentication procedure. Items 402, 404, 406, 408, 410, and 412 of the open system handoff authentication procedure may operate in the same manner as items 302, 304, 306, 308, 310, and 312 in the shared key handoff authentication procedure, respectively. At 414, however, the handoff authentication message exchange may use an "open system" authentication algorithm rather than the "handoff WEP key" authentication algorithm used at 312.

Using the open system authentication algorithm, the handoff access point 16 may authenticate the wireless terminal 12 for handoff without a challenge (a null authentication). After this null authentication, at 416 the wireless terminal 12 may associate with the handoff access point 16. Data packets communicated between the wireless terminal 12 and the handoff access point 16 at 418 may be encrypted by the handoff WEP key.

At step 420, the wireless terminal 12 may communicate terminal authentication packets to the handoff access point 16. Like in 420 above, the terminal authentication packets may be encrypted by the handoff WEP key at 420. Again, however, encryption of the terminal authentication packets may not be necessary. At 422, 424, 426, and 428, the open system handoff authentication procedure may operate in essentially the same manner the shared key handoff authentication procedure at 322, 324, 326, and 328, respectively The open system authentication procedure may not challenge the wireless terminal 12 at 414. Therefore, the handoff access point 16 may include a security procedure that allows the wireless terminal 12 to communicate unencrypted terminal authentication packets to the AAAH server 36. Furthermore, the security procedure may allow the wireless terminal 12 to communicate data packets to the network 8 only if the data packets are encrypted with the handoff WEP key. Illustrative security procedures are shown in FIGS. 5 and 6.

Figure 5:
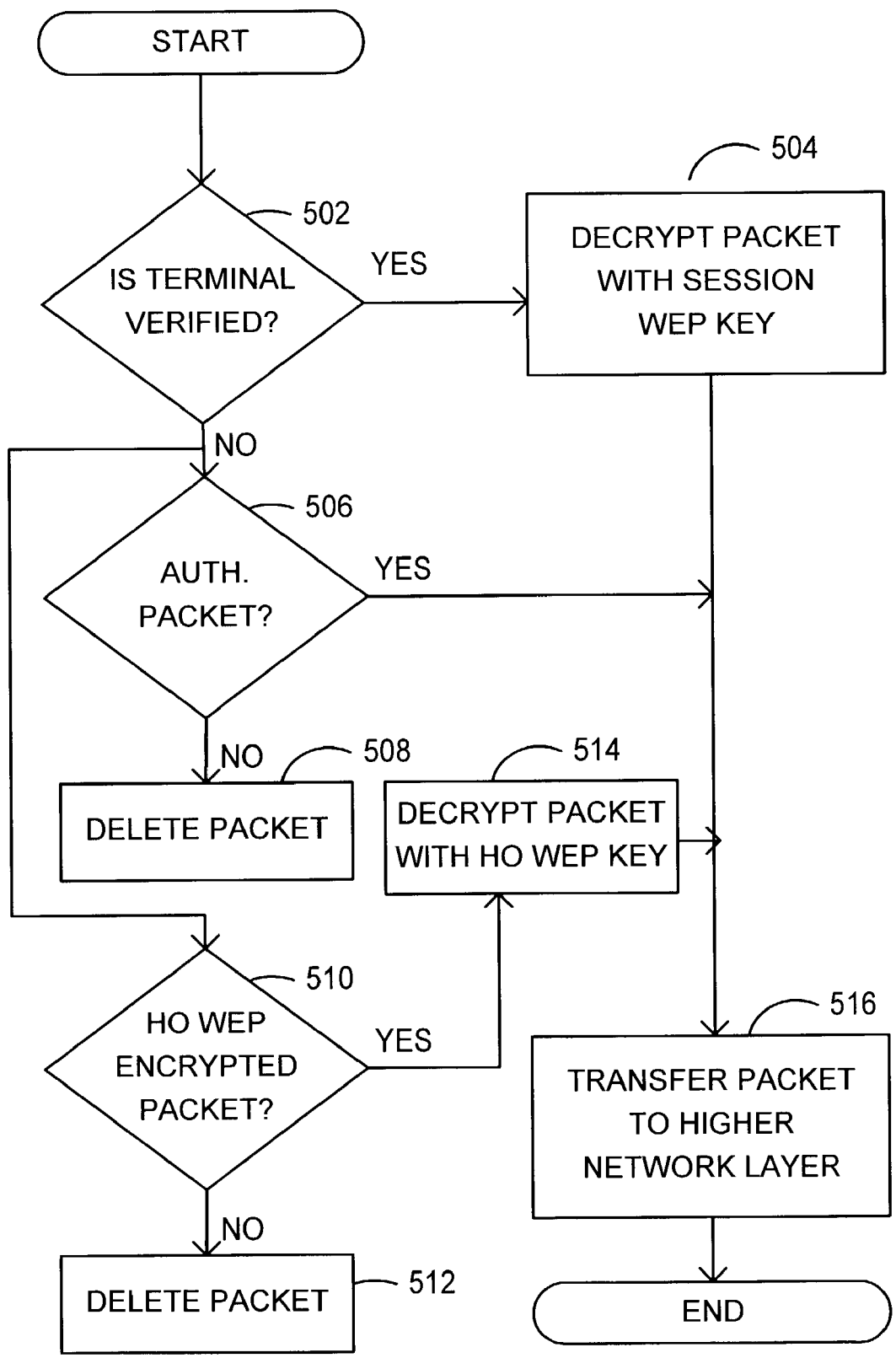
FIG. 5 is a flow chart for a parallel processing security procedure.
Figure 6:
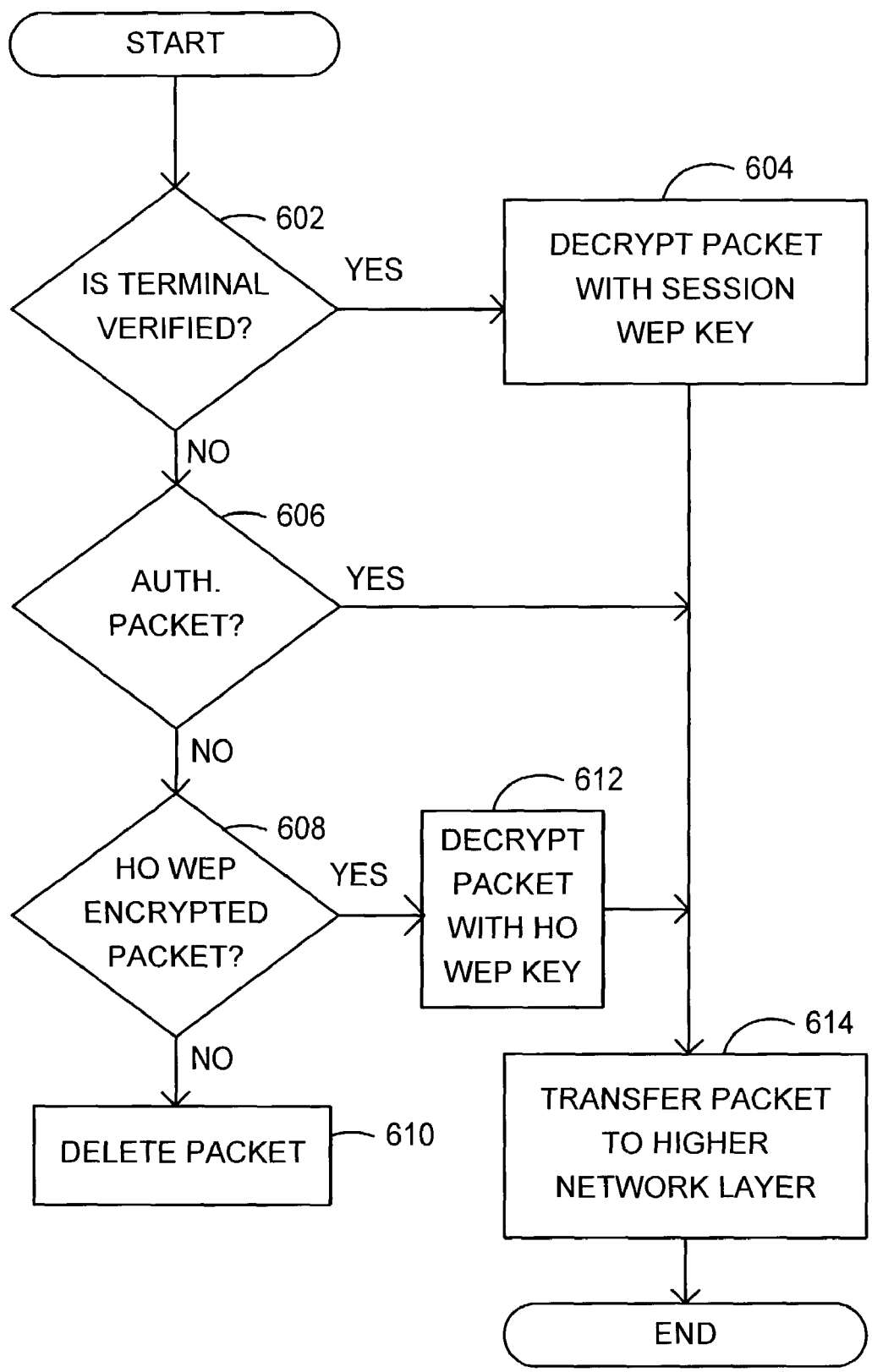
FIG. 6 is a flow chart for a serial processing security procedure.

FIG. 5 shows one security procedure for the handoff access point 16. The security procedure may operate at a data link layer of the handoff access point 16. The security procedure may delete unauthorized packets, while transferring packets from verified media access control (MAC) addresses, terminal authentication packets, and handoff WEP encrypted packets to a higher network layer. When a packet is transferred to a higher network layer, it may continue on towards a destination node.

The handoff access point 16 may register MAC addresses of wireless terminals that are verified and have an associated session WEP key. The handoff access point 16 may receive a packet from the wireless terminal 12. At 502, the handoff access point 16 may determine from origination MAC address of the packet whether the wireless terminal 12 is verified. If so, then the handoff access point 16 will have a session WEP key for the wireless terminal 12. The session WEP key may be used to decrypt the received packet at 504. The decrypted packet may then be transferred to a higher network layer at 516.

On the other hand, if the wireless terminal 12 is not verified, then at 506 and 510 the packet may be further analyzed. At 506, the handoff access point 16 may determine whether the packet is an unencrypted terminal authentication packet destined for the AAAH 36. If so, then packet may then be transferred to a higher network layer at 516. If not, then the packet may be deleted at 508.

At 510, the handoff access point 16 may determine whether the packet is encrypted by the handoff WEP key. If so, then packet may be decrypted at 514. The decrypted packet may then be transferred to a higher network layer at 516. If the packet is not encrypted by the handoff WEP key, then the packet may be deleted at 512.

By operation of the security procedure, packets encrypted by the handoff WEP key may be transferred to a higher network layer. Likewise, unencrypted terminal authentication packets may be transferred to a higher network layer. All other packets, including unencrypted or improperly encrypted data packets, may be deleted.

FIG. 6 shows another security procedure for the handoff access point 16. There is one main difference between the security procedure shown in FIG. 6 and the one shown in FIG. 5. In the security procedure shown in FIG. 6, the received packet is processed in serial rather than in parallel. Items 602 and 604 operate essentially the same as items 502 and 504, respectively. If the MAC address has not been verified, then the handoff access point 16 may proceed from 602 to 606.

At step 606, the handoff access point 16 may determine whether the packet is an unencrypted terminal authentication packet bound for the AAAH 36. If so, then the packet may be transferred to a higher network layer at 614. If not, at 608 the handoff access point 16 may determine whether the packet is encrypted by the handoff WEP key.

If the packet is encrypted by the handoff WEP key, then at 612 the packet may be decrypted. The decrypted packet may be transferred to a higher network layer at 614. If the packet is not encrypted by the handoff WEP key, then at 610 the packet may be deleted. As with the security procedure of FIG. 5, packets encrypted by the handoff WEP key and unencrypted terminal authentication packets may be transferred to a higher network layer, while all other packets may be deleted.

Figure 4:
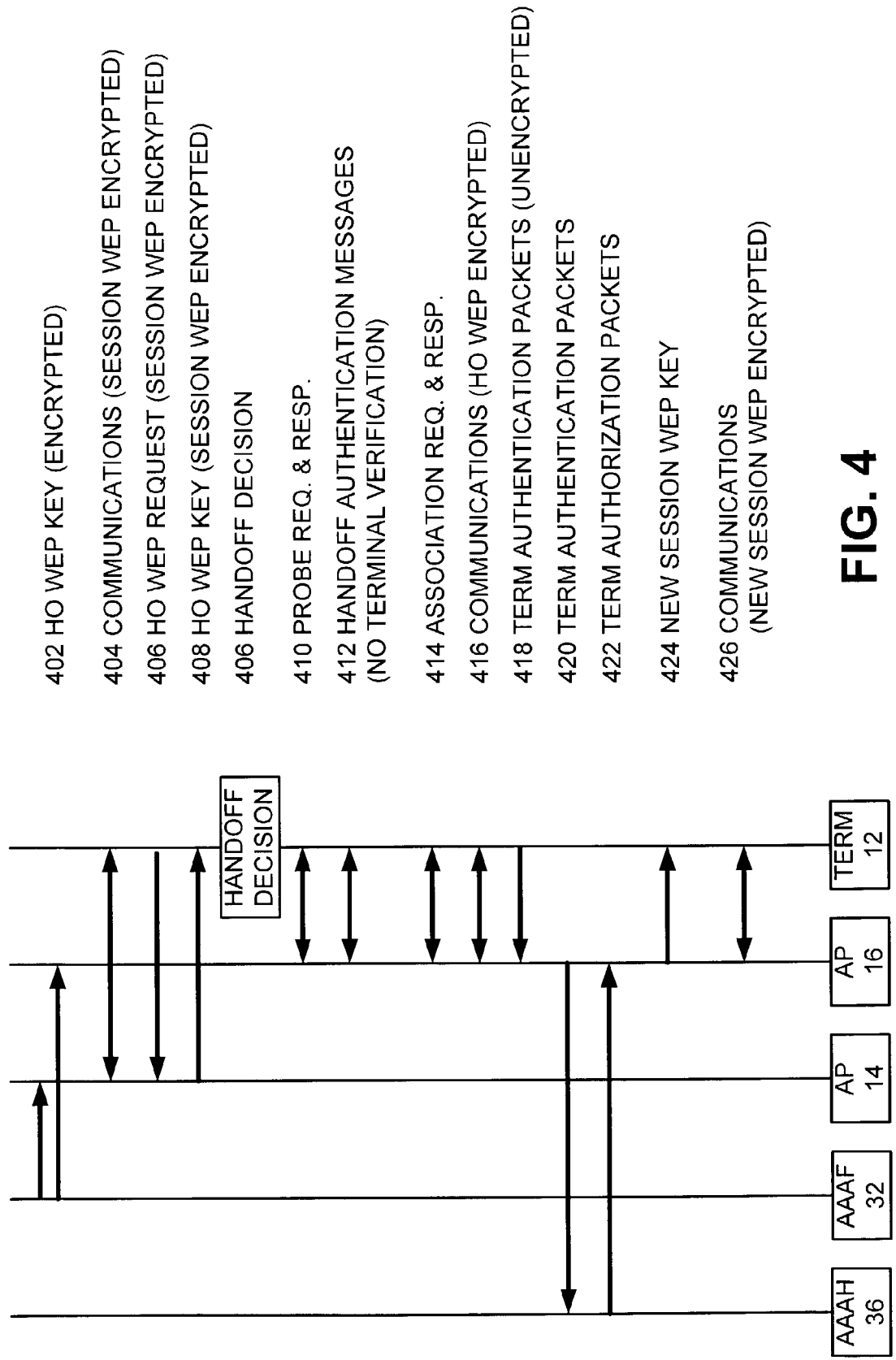
FIG. 4 is a packet communication diagram for an open system handoff procedure.

The open system handoff authentication procedure shown in FIG. 4 may implement the security procedure shown in FIG. 5 or the security procedure shown in FIG. 6. In either case, the open system handoff authentication procedure may operate with a wireless terminal 12 that does not support a handoff WEP key authentication algorithm.

For example, even though such a wireless terminal 12 may not accept a handoff WEP key at 408, it may still probe, be handoff authenticated by, and be associated with the handoff access point 16 at 410, 412, and 414. At 416, the wireless terminal 12 may not communicate data packets because it has no handoff WEP key with which to encrypt them. Any unencrypted data packets the wireless terminal 12 sends to the handoff access point 16 may be deleted by operation of the security procedures shown in FIG. 5 or FIG. 6.

Unencrypted terminal authentication packets from the wireless terminal 12, however, may still be communicated to the AAAH server 36. Therefore, the AAAH server 36 may still authenticate and authorize the wireless terminal 12. Consequently, the handoff access point 16 may still provide the wireless terminal 12 with a new session WEP key at 424, thereby allowing for encrypted data communications at step 426.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for handover in a wireless communication network, comprising the steps of:
   providing a handoff key to a first access point and a second access point;
   transmitting the handoff key from the first access point to a wireless terminal associated with the first access point; and
   authenticating the wireless terminal with the second access point and communicating data packets encrypted with the handoff key between the second access point and the wireless terminal.

2. The method of claim 1, where transmitting the handoff key from the first access point to the wireless terminal further includes the step of encrypting the handoff key with a session key.

3. The method of claim 1, further including the step of authenticating the wireless terminal with an authentication server.

4. The method of claim 3, where authenticating the wireless terminal with the authentication server further includes communicating terminal authentication packets via the second access point between the wireless terminal and the authentication server.

5. The method of claim 4, where communicating terminal authentication packets includes encrypting the terminal authentication packets with the handoff key.

6. The method of claim 4, where communicating the terminal authentication packets includes transmitting the terminal packets unencrypted.

7. The method of claim 3, where authenticating the wireless terminal with the second access point further includes transmitting terminal authorization packets from the authentication server to the second access point.

8. The method of claim 3, further including the step of transmitting a session key from the second access point to the wireless terminal after the wireless terminal is authenticated by the authentication server.

9. The method of claim 1, where providing the handoff key further includes generating the handoff key at a server, and transmitting the handoff key from the server to the first access point and the second access point.

10. The method of claim 1, where authenticating the wireless terminal further includes
    sending a challenge message encrypted with the handoff key from the second access point to the wireless terminal,
    decrypting the challenge message at the wireless terminal with the handoff key, and
    transmitting the decrypted challenge message from the wireless terminal to the second access point.

11. The method of claim 1, where transmitting the handoff key from the first access point to the wireless terminal further includes transmitting the handoff key to the wireless terminal if the wireless terminal is actively communicating via the first access point.

12. The method of claim 1, where providing the handoff key further includes generating the handoff key from time to time at a server, and transmitting the generated handoff key from the server to the first access point and the second access point.

13. The method of claim 1, where transmitting the handoff key further includes
   transmitting a handoff key request from the wireless terminal to the first access point, and
   transmitting the handoff from the first access point to the wireless terminal in response to the request.

14. The method of claim 1, where transmitting the handoff key further includes transmitting a seed to generate a handoff key from the first access point to the wireless terminal.

15. A method as in claim 1, wherein the first access point and the second access points belong to different subnetworks.

16. A method as in claim 1, wherein the handoff key is provided to more than one access point for encrypted communication with one or more wireless terminals.

17. A wireless network comprising:
   a wireless terminal operable to receive a handoff key provided by a server, encrypt data with the handoff key, and transmit the encrypted data;
   a first access point operable to transmit the handoff key to the wireless terminal; and
   a second access point operable to receive the encrypted data from the wireless terminal, and decrypt the encrypted data with the handoff key, having received the handoff key from the server.

18. The wireless network of claim 17, wherein the server is coupled to the first access point and the second access point, the server operable to generate the handoff key and transmit the handoff key to the first access point and the second access point.

19. The wireless network of claim 17, wherein the server is coupled to the first access point and the second access point, the server operable to communicate terminal authentication packets with the wireless terminal, authenticate the wireless terminal, and communicate terminal authorization packets with the second access point.

20. A wireless network as in claim 17, wherein the first access point and the second access points belong to different subnetworks.

21. A wireless network as in claim 17, wherein the handoff key is provided to more than one access point for encrypted communication with one or more wireless terminals.

* * * * *